United States Patent Office 3,028,371
Patented Apr. 3, 1962

3,028,371
PROCESS FOR MAKING POLYMERS
OF ACRYLONITRILE
Marvin Wishman, White Plains, N.Y., and Witold R.
Kocay, Stamford, Conn., assignors to American Cyanamid Company, New York, N.Y., a corporation of Maine
No Drawing. Filed May 26, 1961, Ser. No. 112,749
7 Claims. (Cl. 260—80.5)

This invention relates to the preparation of polymers. More particularly, the invention is concerned with certain new and useful improvements in a method of preparing a polymer of polymerizable material comprising at least one compound containing a $CH_2=C<$ grouping by polymerizing said polymerizable material in an aqueous medium at a pH not higher than about 4.0, using a particular polymerization catalyst system, namely, a redox-catalyst system comprising chlorate ions and sulfite ions. The invention is especially useful and valuable in the preparation of polymers (homopolymers and copolymers) of acrylonitrile.

Polymers of acrylonitrile and of other polymerizable organic compounds containing at least one ethylenic bond are, of course, known. These polymers have achieved wide use in the production of many valuable commercial products, e.g., plastic and coating compositions, synthetic rubber, and, more recently, synthetic fibers.

Difficulties have been encountered in polymerizing certain of the aforementioned polymerizable organic compounds, e.g., acrylonitrile alone and with other monomers, and especially in controlling the average molecular weight and molecular-weight distribution of the polymer; and considerable effort has been spent in developing practical processes for preparing these extremely useful homopolymers and copolymers that would overcome these difficulties. Thus, recent developments in the polymerization of acrylonitrile have been concerned largely with polymerization in aqueous media, for instance, as described in Jacobson United States Patent No. 2,436,926, March 2, 1948, Brubaker and Jacobson United States Patent No. 2,462,354, February 22, 1949, Rothrock United States Patent No. 2,640,049, May 26, 1953, and Scheiderbauer et al. United States Patent No. 2,748,106, May 29, 1956; and with the use of redox-catalyst systems that aim to give a high yield of polymer in a short time at a moderate temperature. Redox-catalyst systems comprising a peroxy compound and a sulfoxy compound, such as, for example, ammonium persulfate and sodium bisulfite, have been used for the homopolymerization and co-polymerization of acrylonitrile and other vinyl compounds (see, for example, the aforementioned United States patents); and, also redox systems comprising a water-soluble chlorate, e.g., sodium or potassium chlorate, and a water-soluble sulfite or bisulfite, e.g., sodium sulfite or bisulfite (see, for instance, Hill United States Patent No. 2,673,192, March 23, 1954, Cresswell United States Patent No. 2,751,374, June 19, 1956, and Mallison United States Patent No. 2,777,832, January 15, 1957).

The problems encountered in forming spinnable or fiber-forming polymers, more particularly copolymers of acrylonitrile and a vinylpyridine, that are uniform from the standpoint of molecular-weight distribution and structure, and in other characteristics, are pointed out in the above-named Rothrock Patent No. 2,640,049.

The present invention is based on our discovery that, in a polymerization method of the kind broadly described in the first paragraph of this specification, the useful properties of the polymer (especially for fiber purposes) that is obtained can be improved by decreasing the ratio of molar equivalents of sulfite ions to the polymerizable material (more particularly a monomeric material) comprising at least one compound containing a $CH_2=C<$ grouping, e.g., acrylonitrile, together with a decrease in the ratio of molar equivalents of chlorate ions to said polymerizable material that is greater than the decrease in the ratio of molar equivalents of sulfite ions to said polymerizable material. More particularly, we have found that, by employing the above technique, we can produce polymers of controlled average weight; and additionally, when each ratio is kept relatively low, polymers of improved color are obtained and from which fibers and other products of improved color and color stability can be secured. This discovery was quite surprising and unexpected; in no way could have been predicted from the teachings of the prior art; and its practical advantages will be immediately apparent to those skilled in the art.

By the use of the concept of the present invention, the amount of total catalyst used in polymerization can be decreased, without any substantial change in molecular weight, in the following way:

If only the ratio of molar equivalents of chlorate ions to polymerizable material (i.e., ratio of chlorate to monomer) is decreased, the molecular weight decreases; and if only the ratio of sulfite ions to polymerizable material (i.e., ratio of sulfite to monomer) is decreased, the molecular weight is increased. Therefore, a proper simultaneous decrease of both chlorate and sulfite will keep the molecular weight at the same level, but the total amount of catalyst will be decreased. Thus, a simultaneous decrease in sulfite to correct for the decrease in chlorate, that is, to lower the molecular weight to a desired point, will result in a somewhat lower conversion to polymer. However, the polymer which is formed has several very marked advantages. For instance, in the case of an acrylonitrile polymer, the polymer itself is whiter and forms fiber which is whiter; and, also, is more linear as evidenced from a comparison of its viscosity average molecular weight and its weight average molecular weight. Spinning of spinning solutions or "dopes" made from this improved polymer can be carried out more easily, as demonstrated by considerably better pull-away data. Also, fibers formed from these improved polymers have improved properties, as shown by their higher tenacity when made under the same conditions.

As shown by the aforementioned Hill, Cresswell, and Mallison patents, acidic aqueous catalyst systems containing reducible chlorate ions and oxidizable sulfoxy ions have been suggested for use in the polymerization of various vinyl compounds, including vinyl chloride, acrylonitrile, vinyl acetate, and others. The oxidizable sulfoxy ions used in such systems have generally been of the group consisting of sulfite, bisulfite, and hydrosulfite ions, and these same sulfoxy ions comprise a preferred group employed in practicing the present invention, but it is not intended that the invention shall be limited to the use of only this group. While the components of an oxidation-reduction or redox-catalyst system of this nature may be introduced as chloric and sulfurous acids, these acids are relatively unstable; therefore, it is usually more convenient to add the desired ions to the polymerization system in the form of a water-soluble chlorate and a water-soluble salt containing the oxidizable sulfoxy ion, e.g., a water-soluble sulfite, together with a suitable acid such, for instance, as sulfuric acid, phosphoric acid, hydrochloric acid, etc. During polymerization in an aqueous system containing a chlorate-sulfoxy catalyst combination, the chlorine is reduced and the sulfur simultaneously oxidized.

The improvement of the present invention is applicable in a polymerization method of the kind broadly described in the first paragraph of this specification, and which can be carried out batchwise, semicontinuously or continuously. A continuous method is preferred. Polymerization can be effected while the polymerizable material (e.g., a single or a plurality of monomers) is dissolved or dispersed (as by emulsification, for example) in an aqueous medium having a pH of 4.0 or less, advantageously from about 2.0 to about 3.6. The reaction mass comprises the polymerizable material, the aforesaid aqueous medium and a redox-polymerization-catalyst system that includes, as essential components, (a) a water-soluble chlorine compound that yields chlorate ions in an aqueous acidic medium and (b) a water-soluble sulfoxy compound that yields oxidizable sulfoxy ions in an aqueous acidic medium. This aqueous acidic medium advantageously comprises an aqueous solution of a non-oxidizable acid having a dissociation constant greater than $10^{-3}$, e.g., sulfuric, nitric, phosphoric, hydrochloric, or other strong acid.

When the polymerization reaction is carried out continuously, one can, if desired or required, charge additional water to the reactor, separately or with one or another of the various feeds of the aforementioned ingredients, so that a desired concentration of materials in the aqueous medium is maintained in the reactor. It is usually preferable to limit the amount of water so that the total weight of polymerizable monomers is between about 15% and 50% of the total material charged during the polymerization reaction. This is especially true when the polymerizable material comprises a substantial amount of acrylonitrile, since the resulting suspension of polymer then has excellent pumping characteristics, as well as outstanding drainage or filtering qualities. Additional economies are, of course, realized in that a small volume of the reaction mass is processed and handled. No difficulties are encountered with respect to separation of polymerizable material, since the polymerizable ingredient or ingredients are charged at a rate which is correlated with the rate of polymerization in such a manner that separation of polymerizable material, specifically monomeric material, does not occur.

In the redox-polymerization-catalyst system employed, the amount of chlorate ions introduced to the reaction mass (reactor) generally will be between about 0.1% and about 2.0% of the weight of the polymerizable monomeric material, and the oxidizable ions, specifically sulfoxy ions, will be present in a quantity ranging between about 0.1% and about 6% by weight on the same basis. Larger amounts of the catalyst components, e.g., 3 or more percent of chlorate ions and 9 or more percent of sulfoxy ions, are operative, but appear to provide no additional benefits. When the oxidizing and reducing components are present in oxidation and reduction equivalents, then in the case of the preferred oxidizable component, 3 moles of the sulfurous acid or a sulfite react per mole of chloric acid or a chlorate. The ratio is the same for bisulfites, but only 1.5 moles of a meta-bisulfite are required, since such salts ionize to form $HSO_3^-$ ions.

In the redox polymerzation catalyst system used in practicing the present invention, any water-soluble chlorine compound that yields chlorate ions in an aqueous acidic medium can be used, for instance: chloric acid, ammonium, and the various alkali-metal (sodium, potassium, lithium, etc.) chlorates; and the various water-soluble, alkaline-earth metal and heavy metal chlorates.

Illustrative examples of reducing agents that can be employed are sulfites, bisulfites, and meta-bisulfites corresponding to the chlorates named in the preceding paragraph, sulfur dioxide, and diethyl and other water-soluble dialkyl sulfites.

By the term "sulfite ions" as used herein and in the appended claims is intended to be included the various sulfoxy species, more particularly $H_2SO_3$ and/or $HSO_3^-$ and $SO_3^=$, the proportionate amounts of these species being a function of pH. We believe that the active component is probably the $H_2SO_3$ molecule.

Relatively low polymerization temperatures, for example, temperatures ranging from about 20° C. to about 70° C., are desirable. Particularly good results are generally obtained when the temperature of polymerization is maintained within the range of from about 35° C. to about 65° C.

It is desirable to conduct the process of the present invention in the absence of oxygen, which has a definite inhibiting effect on the polymerization reaction. Suitable inert gases, such as nitrogen and carbon dioxide, may be used to displace air in the reaction zone.

Polymerizable materials that can be polymerized (homopolymerized or copolymerized) include those mentioned in the aforesaid Hill, Cresswell, and Mallison patents. Other examples (some of which are named by Hill, Cresswell, or Mallison in their patents) are the vinyl aromatic and isopropenyl aromatic compounds, more particularly the different vinyl aromatic and isopropenyl aromatic hydrocarbons (e.g., the various dialkyl styrenes, isopropenyl toluene, etc.), other aliphatic compounds containing a $CH_2=C<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and N-substituted alkacrylamides, for instance, N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl chloroacetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc. esters of acrylic, methacrylic, ethacrylic, phenylacrylic, etc., acids including the alkyl acrylates containing not more than four carbon atoms in the alkyl grouping, examples of which are given above, diallyl amine, dimethallyl amine, vinyl ethyl ether, diallyl benzene, as well as other vinyl aromatic and vinyl aliphatic compounds, and other compounds containing a $CH_2=C<$ grouping, more particularly a single $CH_2=C<$ grouping. Two, three, four, five, or any desired higher number of monomers can be admixed and copolymerized in accordance with the present invention. In producing fiber-forming copolymers, and which preferably have an average molecular weight within the range of from about 60,000 to about 90,000, we prefer that the modifying comonomer employed be one that contains a single $CH_2=C<$ grouping. The average "molecular weight," as defined herein, is determined from an absolute viscosity value of a 1% solution of the polymer in 50% aqueous sodium thiocyanate.

In practicing the present invention to produce fiber-forming (fiber-formable) acrylonitrile copolymers, the monomeric materials generally comprises more than 50%, more particularly at least 70% by weight of acrylonitrile, e.g., 100% acrylonitrile; or more than 50% by weight of acrylonitrile while the remainder is constituted of at least one other different compound which is copolymerizable with acrylonitrile and which contains a $CH_2=C<$ grouping. Thus, in addition to acrylonitrile, the polymerizable material may include a plurality of different compounds which are copolymerizable with acrylonitrile and each one of which contains a $CH_2=CH-$ grouping, at least one of said compounds being a vinyl-pyridine. The present invention provides good results in preparing a copolymer of monomeric material comprising at least 80% by weight of acrylonitrile, from 2 to 15% by weight of a vinylpyridine, and from 2 to 15% by weight of vinyl acetate, methyl acrylate, acrylamide, methacrylamide, acrylic acid, methacrylic acid, methacrylonitrile, or the like.

Illustrative examples of vinylpyridines that can be copolymerized with acrylonitrile, alone or with one or more other copolymerizable monomers, by the method of the present invention, include vinylpyridines represented by the formula I 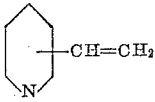

and which include 2-vinylpyridine, 3-vinylpyridine, and 4-vinylpyridine; methyl vinylpyridines represented by the formula II 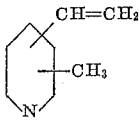

and which include 2-methyl-3-vinylpyridine, 2-methyl-5-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, and 3-methyl-4-vinylpyridine. The vinylpyridines embraced by Formula II are a preferred sub-group within a broader class of vinylpyridines that are advantageously employed in continuously making dyeable, fiber-forming binary and ternary polymers in accordance with the instant invention and which may be represented by the formula III 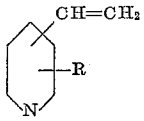

wherein R represents a lower alkyl radical, more particularly a methyl, ethyl, propyl (including n-propyl and isopropyl) or butyl (including n-butyl, isobutyl, sec.-butyl and tert.-butyl) radical. Other examples include the 2- and 4-vinylquinolines, the various vinyl isoquinolines, 2-vinyl-4,6-dimethylpyridine, 2-vinyl-4,6-diethylpyridine, and others embraced by the formula IV 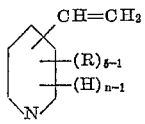

where R represents a lower alkyl radical, examples of which have been given hereinbefore, and $n$ represents an integer from 1 to 5, inclusive.

In order that those skilled in the art may better understand how the present invention can be carried into effect, the following examples are given by way of illustration and not by way of limitation. All parts and percentages are by weight unless otherwise stated.

The polymers described in the examples are converted to fibers following the general procedure described in, for instance, U.S. Patents Nos. 2,558,730, –731, and –733. A spinning solution comprised of ten parts of polymer, 45 parts of sodium thiocyanate, and 45 parts of water is extruded at a temperature of 95° C. through a 45-hole spinnerette at such a rate that 0.584 gram of polymer is extruded per minute. The maximum rate at which the gelled fiber can be collected without causing a break is considered to be the "maximum pullaway." Under standard conditions the fiber in gel state is collected at 10 meters/minute, washed free of solvent, and stretched during its passage through a hot water bath by passing it about a roll having a peripheral speed of 82.3 meters/minute. The stretched fiber is then dried and heated in relaxed state as described in the aforementioned patents, after which it is wound onto a bobbin at the rate of 70 meters per minute. The final denier of the fiber is 1.67/filament.

*Example 1*

(A) One hundred and fifty-two (152) parts (2.87 moles) of acrylonitrile, 8 parts (0.093 mole) of methyl acrylate, 1.2 parts (0.033 mole) of hydrogen chloride, and 1439 parts of deionized water are charged into a round-bottomed flask. The flask is placed in a constant-temperature bath, and a condenser, thermometer, stirrer, nitrogen-inlet tube, and dropping funnel are attached. The monomer mixture is heated at 40° C. under nitrogen for one hour. The catalyst, 0.546 part (0.00513 mole) of sodium chlorate and 5.17 parts (0.0411 mole) of sodium sulfite, is dissolved in 150 cc. of water into the dropping funnel. Forty (40) percent of the catalyst, 60 cc. of solution, is rapidly added to the reaction vessel. After 25 minutes, an additional 22.5 cc. of catalyst solution is added. The remaining catalyst solution is added at 25-minute intervals in volumes of 22.5, 15, 15, 7.5, and 7.5 cc. Catalyst addition is complete in 2.5 hours. The mixture is agitated 1.5 hours longer, and the polymer is collected by filtration. The pH of the effluent mother liquor is 2.8. In this example, the mole ratio of sodium chlorate to monomer is 0.00173, while the mole ratio of sodium sulfite to monomer is 0.0138. Conversion of monomer to polymer is 81 percent of theory. The polymer has an average molecular weight of 78,000.

(B) The above example is repeated, except that 0.375 part (0.00352 mole) of sodium chlorate and 4.44 parts (0.0352 mole) of sodium sulfite are used. In this case, the mole ratio of sodium chlorate to monomer is 0.00119, while the mole ratio of sodium sulfite to monomer is 0.0119. Conversion of monomer to polymer is 80 percent of theory. The polymer has an average molecular weight of 84,000.

A comparison of the (A) and (B) portions of this example shows that the average molecular weight is maintained substantially constant, despite the decrease in total catalyst used, by decreasing the mole ratio of sodium chlorate to monomer by 1.46-fold along with a simultaneous 1.17-fold decrease of the mole ratio of sodium sulfite to monomer.

The physical properties of the polymers formed in (A) and (B) and of their respective fibers produced as described above are tabulated.

| Sample | Solution (5.0 g./100) APHA [1] | Maximum Pullaway (meters/minute) | Fiber Yellowness [2] |
|---|---|---|---|
| A | 300 | 11.5 | 0.157 |
| B | 190 | 12.9 | 0.133 |

[1] Polymer color is determined by measuring the APHA color value of a solution of 5.0 g. of polymer in 100 cc. of dimethylformamide. The APHA is a recognized standard for comparing liquids of yellow color.

[2] The procedure employed in determining fiber yellowness is to wind upon a brass frame 2¼" x 3" a sufficient layer of fibers to be absolutely opaque; the number of turns varies with the denier. The spectral reflectance vs. $MgCO_3$ is recorded with a glass cover over the fibers using a G.E. recording spectrophotometer with the fibers running in a horizontal plane. Yellowness is then calculated from the equation:

$$Yellowness = \frac{\%R650m\mu - \%R430m\mu}{\%R550m\mu \times 1.57}$$

This procedure was evolved from a method using the Hunter reflectometer as described in Federal Specification Tests TTP-141-b method 613.1 for use in the surface-coatings field. The abbreviation "% R" in the foregoing equation means the percent reflectance at the specified millimicrons wave length. The factor 1.57 in the above equation gives the yellowness a numerical value usually equal to that which would be obtained if the measurements were made on a Hunter reflectometer and using the formula:

$$Yellowness = \frac{Amber-Blue}{Green}$$

*Example 2*

(A) One hundred and forty-eight (148) parts (2.79 moles) of acrylonitrile, 12 parts (0.14 mole) of vinyl acetate, 1.2 parts (0.033 mole) of hydrogen chloride, and 1439 parts of deionized water are charged into a round-bottomed flask. The apparatus is assembled as in Example 1. The catalyst, 1.02 parts (0.00958 mole) of sodium chlorate and 6.05 parts (0.0480 mole) of sodium sulfite, is dissolved in 150 cc. of water into a dropping funnel. Polymerization is conducted as in Example 1. The pH of the effluent mother liquor is 2.9. In this example, the mole ratio of sodium chlorate to monomer is 0.00327, while the mole ratio of sodium sulfite to monomer is 0.0164. Conversion of monomer to polymer is 85 percent of theory. The polymer has an average molecular weight of 70,000.

(B) The above example is repeated, except that 0.461 part (0.00433 mole) of sodium chlorate and 5.45 parts (0.0432 mole) of sodium sulfite are used. In this case, the mole ratio of sodium chlorate to monomer is 0.00148, while the mole ratio of sodium sulfite to monomer is 0.0148. Conversion of monomer to polymer is 62 percent of theory. The polymer has an average molecular weight of 71,000.

A comparison of the (A) and (B) portions of this example shows that the average molecular weight is maintained substantially constant, despite the decrease in the total catalyst used, by decreasing the mole ratio of sodium chlorate to monomer by 2.21-fold along with a simultaneous 1.11-fold decrease of the mole ratio of sodium sulfite to monomer.

If the mole ratio of sodium chlorate and sodium sulfite to monomer are each decreased by the same percent the average molecular weight increases as expected.

The physical properties of the polymers formed in (A) and (B) and of their respective fibers produced as described above are tabulated.

| Sample | Solution APHA | Maximum Pullaway | Fiber Yellowness |
|---|---|---|---|
| A | 605 | 11.8 | 0.146 |
| B | 430 | 12.7 | 0.127 |

*Example 3*

(A) One hundred and forty-four (144) parts (2.72 moles) of acrylonitrile, 8 parts (0.093 mole) of vinyl acetate, 8 parts (0.067 mole) of 2-methyl-5-vinyl-pyridine, 3.39 parts (0.093 mole) of hydrogen chloride, and 980 parts of deionized water are charged into a round-bottomed flask. The apparatus is assembled as in Example 1. The catalyst, 1.702 parts (0.0160 mole) of sodium chlorate and 6.05 parts (0.480 mole) of sodium sulfite, is dissolved in 150 cc. of water into a dropping funnel. Polymerization is conducted as in Example 1. The pH of the effluent mother liquor is 2.0. In this example, the mole ratio of sodium chlorate to monomer is 0.00556, while the mole ratio of sodium sulfite to monomer is 0.0167. Conversion of monomer to polymer is 82 percent of theory. The polymer has an average molecular weight of 72,000.

(B) The above example is repeated, except that 0.579 part (0.00544 mole) of sodium chlorate and 3.425 parts (0.0272 mole) of sodium sulfite are used. In this case, the mole ratio of sodium chlorate to monomer is 0.00189, while the mole ratio of sodium sulfite to monomer is 0.00945. Conversion of monomer to polymer is 74 percent of theory. The polymer has an average molecular weight of 73,000.

A comparison of the (A) and (B) portions of this example shows that the average molecular weight is maintained substantially constant, despite the decrease in total catalyst used, by decreasing the mole ratio of sodium chlorate to monomer by 2.94-fold along with a simultaneous 1.76-fold decrease of the mole ratio of sodium sulfite to monomer. If the mole ratio of sodium chlorate and sodium sulfite to monomer are each decreased by the same percent, the average molecular weight increases as expected.

(C) The above example is repeated, except that 0.443 part (0.00416 mole) of sodium chlorate and 3.14 parts (0.0249 mole) of sodium sulfite are used. In this case, the mole ratio of sodium chlorate to monomer is 0.00145, while the mole ratio of sodium sulfite to monomer is 0.00865. Conversion of monomer to polymer is 70 percent of theory. The polymer has an average molecular weight of 71,000.

A comparison of the (A) and (C) portions of this example shows that the average molecular weight is maintained substantially constant, despite the decrease in total catalyst used, by decreasing the mole ratio of sodium chlorate to monomer by 3.84-fold along with a simultaneous 1.93-fold decrease of the mole ratio of sodium sulfite to monomer. If the mole ratio of sodium chlorate and sodium sulfite to monomer are each decreased by the same percent, the average molecular weight increases as expected.

The physical properties of the polymers formed in (A), (B), and (C) and of their respective fibers produced as described above are tabulated.

| Sample | Solution APHA | Maximum Pullaway | Fiber Yellowness | Tenacity grams/den. | Elongation (percent) |
|---|---|---|---|---|---|
| A | 175 | 11.0 | 0.140 | 2.1 | 18.5 |
| B | 145 | 14.2 | 0.124 | 2.7 | 17.0 |
| C | 115 | 14.6 | 0.090 | 3.0 | 21.5 |

*Example 4*

(A) One hundred and forty-four (144) parts (2.72 moles) of acrylonitrile, 8 parts (0.093 mole) of methyl acrylate, 8 parts (0.067 mole) of 2-methyl-5-vinyl-pyridine, 3.31 parts (0.091 mole) of hydrogen chloride, and 980 parts of deionized water are charged into a round-bottomed flask. The apparatus is assembled as in Example 1. The catalyst, 1.36 parts (0.0128 mole) of sodium chlorate and 4.84 parts (0.0384 mole) of sodium sulfite, is dissolved in 150 cc. of water into a dropping funnel. Polymerization is conducted as in Example 1. The pH of the effluent mother liquor is 2.2. In this example, the mole ratio of sodium chlorate to monomer is 0.00444, while the mole ratio of sodium sulfite to monomer is 0.0133. Conversion of monomer to polymer is 79 percent of theory. The polymer has an average molecular weight of 71,000.

(B) The above example is repeated, except that 0.426 part (0.00400 mole) of sodium chlorate and 2.52 parts (0.0200 mole) of sodium sulfite are used. In this case, the mole ratio of sodium chlorate to monomer is 0.00139, while the mole ratio of sodium sulfite to monomer is 0.00694. Conversion of monomer of polymer is 60 percent of theory. The polymer has an average molecular weight of 69,000.

A comparison of the (A) and (B) portions of this example shows that the average molecular weight is maintained substantially constant, despite the decrease in total catalyst used, by decreasing the mole ratio of sodium chlorate to monomer by 3.19-fold along with a simultaneous 1.92-fold decrease of the mole ratio of sodium sulfite to monomer. If the mole ratio of sodium chlorate and sodium sulfite to monomer are each decreased by the same percent, the average molecular weight increases as expected.

The physical properties of the polymers formed in (A) and (B) and of their respective fibers produced as described above are tabulated.

| Sample | Solution APHA | Maximum Pullaway | Fiber Yellowness |
|---|---|---|---|
| A | 150 | 8.9 | 0.149 |
| B | 100 | 12.8 | 0.120 |

Example 5

(A) One hundred and forty-four (144) parts (2.72 moles) of acrylonitrile, 8 parts (0.093 mole) of methyl acrylate, 8 parts (0.076 mole) of 4-vinylpyridine, 3.06 parts (0.084 mole) of hydrogen chloride, and 980 parts of deionized water are charged into a round-bottomed flask. The apparatus is assembled as in Example 1. The catalyst, 1.36 parts (0.0128 mole) of sodium chlorate and 4.84 parts (0.0384 mole) of sodium sulfite, is dissolved in 150 cc. of water into a dropping funnel. Polymerization is conducted as in Example 1. The pH of the effluent mother liquor is 2.0. In this example, the mole ratio of sodium chlorate to monomer is 0.00443, while the mole ratio of sodium sulfite to monomer is 0.0133. Conversion of monomer to polymer is 65 percent of theory. The polymer has an average molecular weight of 61,000.

(B) The above example is repeated, except that 0.648 part (0.00609 mole) of sodium chlorate and 3.06 parts (0.0243 mole) of sodium sulfite are used. In this case, the mole ratio of sodium chlorate to monomer is 0.00211, while the mole ratio of sodium sulfite to monomer is 0.00841. Conversion of monomer to polymer is 61 percent of theory. The polymer has an average molecular weight of 62,000.

A comparison of the (A) and (B) portions of this example shows that the average molecular weight is maintained substantially constant, despite the increase in total catalyst used by decreasing the mole ratio of sodium chlorate to monomer by 2.10-fold along with a simultaneous 1.58-fold decrease of the mole ratio of sodium sulfite to monomer. If the mole ratio of sodium chlorate and sodium sulfite are each decreased by the same percent, the average molecular weight increases as expected.

The physical properties of the polymers formed in (A) and (B) and of their respective fibers produced as described above are tabulated.

| Sample | Solution APHA | Maximum Pullaway | Fiber Yellowness |
|---|---|---|---|
| A | 140 | 11.2 | 0.144 |
| B | 95 | 11.8 | 0.100 |

Example 6

(A) One hundred and sixty (160) parts (3.02 moles) of acrylonitrile, 1.2 parts (0.033 mole) of hydrogen chloride, and 1439 parts of deionized water are charged into a round-bottomed flask. The apparatus is assembled as in Example 1. The catalyst, 1.02 parts (0.0096 mole) of sodium chlorate and 6.05 parts (0.0480 mole) of sodium sulfite, is dissolved in 150 cc. of water into a dropping funnel. Polymerization is conducted as in Example 1. The pH of the effluent mother liquor is 2.9. In this example, the mole ratio of sodium chlorate to monomer is 0.00318, while the mole ratio of sodium sulfite to monomer is 0.0159. Conversion of monomer to polymer is 84 percent of theory. The polymer has an average molecular weight of 79,000.

(B) The above example is repeated, except that 0.426 part (0.00400 mole) of sodium chlorate and 5.04 parts (0.0400 mole) of sodium sulfite are used. In this case, the mole ratio of sodium chlorate to monomer is 0.00132, while the mole ratio of sodium sulfite to monomer is 0.0132. Conversion of monomer to polymer is 70 percent of theory. The polymer has an average molecular weight of 81,000.

A comparison of the (A) and (B) portions of this example shows that the average molecular weight is maintained substantially constant, despite the decrease in total catalyst used, by decreasing the mole ratio of sodium chlorate to monomer by 2.41-fold along with a simultaneous 1.20-fold decrease of the mole ratio of sodium sulfite to monomer. If the mole ratio of sodium chlorate and sodium sulfite to monomer are each decreased by the same percent, the average molecular weight increases as expected.

The APHA color values for a solution of 5.0 gram of polymer in 100 cc. of dimethylformamide are 490 and 320, respectively, for polymers from (A) and (B).

Example 7

(A) One hundred and thirty-six (136) parts (2.57 moles) of acrylonitrile, 12 parts (0.14 mole) of vinyl acetate, 12 parts (0.10 mole) of 2-methyl-5-vinyl-pyridine, 4.02 parts (0.11 mole) of hydrogen chloride, and 980 parts of deionized water are charged into a round-bottomed flask. The apparatus is assembled as in Example 1. The catalyst, 2.73 parts (0.0256 mole) of sodium chlorate and 4.84 parts (0.0384 mole) of sodium sulfite, is dissolved in 150 cc. of water into a dropping funnel. Polymerization is conducted as in Example 1. The pH of the effluent mother liquor is 2.4. In this example, the mole ratio of sodium chlorate to monomer is 0.00912, while the mole ratio of sodium sulfite to monomer is 0.0137. Conversion of monomer to polymer is 74 percent of theory. The polymer has an average molecular weight of 63,000.

(B) The above example is repeated, except that 0.205 part (0.00192 mole) of sodium chlorate and 1.45 parts (0.0115 mole) of sodium sulfite are used. In this case, the mole ratio of sodium chlorate to monomer is 0.000685, while the mole ratio of sodium sulfite to monomer is 0.00410. Conversion of monomer to polymer is 58 percent of theory. The polymer has an average molecular weight of 64,000.

A comparison of the (A) and (B) portions of this example shows that the average molecular weight is maintained substantially constant, despite the decrease in total catalyst used, by decreasing the mole ratio of sodium chlorate to monomer by 13.3-fold along with a simultaneous 3.34-fold decrease of the mole ratio of sodium sulfite to monomer. If the mole ratio of sodium chlorate and sodium sulfite to monomer are each decreased by the same percent, the average molecular weight increases as expected.

The physical properties of the polymers formed in (A) and (B) are tabulated.

| Sample | Maximum Pullaway | Weight Average M.W. / Viscosity Average M.W. |
|---|---|---|
| A | 10.6 | 2.46 |
| B | 14.0 | 1.65 |

The ratio of the "weight average molecular weight" to the "viscosity average molecular weight" is taken as a measure of branching. (Reference: Zimm, B. H., and Stockmayer, W. H., J. Chem. Phys. 17, 1, 301 [1949]; Flory, P. J., Principles of Polymer Chemistry, Cornell University Press [1953].)

Example 8

(A) A water-jacketed reactor having a volume of 6.4 liters is supplied with a propeller-type stirrer, driven by a motor rotating at approximately 900 r.p.m. The reactor is equipped with a delivery-feed system; and, at its top, with an overflow tube. Polymer is collected by continuous filtration of the slurry overflow.

Six-thousand four hundred (6,400) grams of water slurry containing 20% polymer prepared in a previous similar reaction ("seed" polymer) is charged to the reactor, adjusted to a pH of about 2 with nitric acid, and its temperature is brought to 45° C. A stream of monomers is introduced to the reactor through one of three delivery tubes. A second stream consists of an aqueous solution of weighed amounts of sodium chlorate and sodium sulfite. The third stream consists of an aqueous solution of nitric acid of known concentration.

Polymer produced during the first four hours of reaction is discarded. Under the conditions of reaction, it has been found that more than 92 percent of the seed polymer has been purged and that a steady state or equilibrium is set up before any polymer product is collected. The temperature of the reaction is maintained at 45° C. Monomer concentration and residence time are controlled by the feed rates at 28 percent monomer concentration and 1.5 hour residence time in the reactor. The pH is maintained at 2.0.

The composition of the feeds is as follows:

Feed I—Monomers (85.0% acrylonitrile, 8.4% vinyl acetate, and 6.6% 4-vinylpyridine)
Feed II—Catalyst (102.5 grams of $NaClO_3$ and 363.0 grams of $Na_2SO_3$ in solution in 16 liters of water)
Feed III—Acid (512.5 grams of $NHO_3$ in solution in 16 liters of water)

Monomers (feed I) are fed at 1410 cc./hr., 1155 grams/hr. Catalyst (feed II) is fed at 1430 cc./hr. Therefore, the rate of $NaClO_3$/hr. is 9.15 grams/hr. and the rate of $Na_2SO_3$/hr. is 32.4 grams/hr. Acid (feed III) is fed at 1430 cc./hr. At equilibrium, the conversion of monomer to polymer is 76 percent. The polymer has an average molecular weight of 68,000.

(B) The above example is repeated in every detail, except that the catalyst (feed II) contains 51.25 grams of $NaClO_3$ and 242.0 grams of $Na_2SO_3$ in 16 liters of water. Since all feed rates are the same, the rate of $NaClO_3$/hr. is 4.58 grams/hr., and the rate of $Na_2SO_3$/hr. is 21.6 grams/hr. At equilibrium, the conversion of monomer to polymer is 71 percent. The polymer has an average molecular weight of 69,000.

A comparison of the (A) and (B) portions of this example shows that the average molecular weight is maintained substantially constant, despite the decrease in total catalyst used, by decreasing the mole ratio of sodium chlorate to monomer by 2.00-fold along with a simultaneous 1.50-fold decrease of the mole ratio of sodium sulfite to monomer. If the mole ratio of sodium chlorate and sodium sulfite to monomer are each decreased by the same percent, the average molecular weight increases as expected.

The physical properties of the polymers formed in (A) and (B) and of their respective fibers formed as described above are tabulated.

| Sample | Solution APHA | Maximum Pullaway |
|---|---|---|
| A | 120 | 13.9 |
| B | 90 | 14.8 |

*Example 9*

(A) The procedure of Example 8 is followed, except for feed composition. The temperature is maintained at 50° C.

Feed I—Monomers (90% acrylonitrile, 5.0% vinyl acetate, 5.0% 2-methyl-5-vinylpyridine)
Feed II—Catalyst (85.8 grams of $NaClO_3$ and 253.0 grams of $Na_2SO_3$ in 16 liters of water)
Feed III—Acid (299 grams of $HNO_3$ in solution in 16 liters of water)

The rate of $NaClO_3$/hr. is 7.66 grams/hr. The rate of $Na_2SO_3$/hr. is 22.6 grams/hr. The pH is maintained at 3.3. At equilibrium, the conversion of monomer to polymer is 81 percent of theory. The polymer has an average molecular weight of 72,000.

(B) The above example is repeated in every detail, except that the catalyst (feed II) contains 60.2 grams of $NaClO_3$ and 213.0 grams of $Na_2SO_3$ in 16 liters of water. Since all feed rates are the same, the rate of $NaClO_3$/hr. is 5.38 grams/hr., and the rate of $Na_2SO_3$/hr. is 19.0 grams/hr. At equilibrium, the conversion of monomer to polymer is 78 percent of theory. The polymer has an average molecular weight of 70,000.

A comparison of the (A) and (B) portions of this example shows that the average molecular weight is maintained substantially constant, despite the decrease in total catalyst used, by decreasing the mole ratio of sodium chlorate to monomer by 1.43-fold along with a simultaneous 1.19-fold decrease of the mole ratio of sodium sulfite to monomer. If the mole ratio of sodium chlorate and sodium sulfite to monomer are each decreased by the same percent, the average molecular weight increases as expected.

(C) The above example is repeated in every detail, except that the catalyst (feed II) contains 42.2 grams of $NaClO_3$ and 187.0 grams of $Na_2SO_3$ in 16 liters of water. Since all feed rates are the same, the rate of $NaClO_3$/hr. is 3.77 grams/hr., and the rate of $Na_2SO_3$/hr. is 16.7 grams/hr. At equilibrium, the conversion of monomer to polymer is 75 percent of theory. The polymer has an average molecular weight of 69,000.

A comparison of the (A) and (C) portions of this example shows that the average molecular weight is maintained substantially constant, despite the decrease in the total catalyst used, by decreasing the mole ratio of sodium chlorate to monomer by 2.03-fold along with a simultaneous 1.35-fold decrease of the mole ratio of sodium sulfite to monomer. If the mole ratio of sodium chlorate and sodium sulfite to monomer are each decreased by the same percent, the average molecular weight increases as expected.

(D) The above example is repeated in every detail, except that the catalyst (feed II) contains 30.1 grams of $NaClO_3$ and 151.0 grams of $Na_2SO_3$ in 16 liters of water. Since all feed rates are the same, the rate of $NaClO_3$ is 2.69 grams/hr., and the rate of $Na_2SO_3$ is 13.5 grams/hr. At equilibrium, the conversion of monomer to polymer is 68 percent of theory. The polymer has an average molecular weight of 72,000.

A comparison of the (A) and (D) portions of this example shows that the average molecular weight is maintained substantially constant, despite the decrease in the total catalyst used, by decreasing the mole ratio of sodium chlorate to monomer by 2.86-fold along with a simultaneous 1.68-fold decrease of the mole ratio of sodium sulfite to monomer. If the mole ratio of sodium chlorate and sodium sulfite to monomer are each decreased by the same percent, the average molecular weight increases as expected.

The physical properties of the polymers formed in (A), (B), (C), and (D) and of their respective fibers produced as described above are tabulated.

| Sample | Maximum Pullaway | Fiber Yellowness |
|---|---|---|
| A | 12.0 | 0.130 |
| B | 13.7 | 0.104 |
| C | 13.8 | 0.098 |
| D | 14.1 | 0.086 |

This application is a continuation-in-part of our copending application Serial No. 711,143, filed January 27, 1958, and allowed March 13, 1961.

We claim:

1. The method which comprises preparing a reaction mass comprising a polymerizable material in an aqueous medium having a pH not higher than about 4.0 and having a content of said polymerizable material not greater than 50%, said polymerizable material being selected from the group consisting of (1) acrylonitrile and (2) mixtures containing more than 50% by weight of acrylonitrile, the balance being at least one other different compound which is copolymerizable with acrylonitrile and which contains a $CH_2C<$ grouping; introducing into said reaction mass a redox-catalyst system comprising chlorate ions and sulfite ions, the amount of the chlorate ions being within the range of from about 0.1% to about 3% and that of the sulfite ions within the range of from about 0.1% to about 9%, said percentages being by weight of the said polymerizable material; polymerizing the reaction mass containing the said redox-catalyst system and polymerizable material; and, at any norm of chlorate ions and of sulfite ions within the aforementioned ranges of percentage proportions of said ions to said polymerizable material and while keeping the said reaction mass at a substantially constant temperature and at a substantially constant pH not higher than about 4.0, improving the useful properties of the resulting polymer, especially for fiber purposes, by decreasing below said norm the ratio of molar equivalents of sulfite ions to said polymerizable material together with a decrease in the ratio of molar equivalents of chlorate ions to said polymerizable material that is greater than the decrease below said norm in the ratio of molar equivalents of sulfite ions to said polymerizable material, the amounts of the chlorate and sulfite ions after said decreases remaining, however, within the aforesaid ranges of from about 0.1% to about 3% of chlorate ions and about 0.1% to about 9% of sulfite ions based on the weight of said polymerizable material.

2. A method as in claim 1 wherein the amount of the chlorate ions is within the range of from about 0.1% to about 2% and that of the sulfite ions within the range of from about 0.1% to about 6%, the said percentages being based on the weight of polymerizable material defined in claim 1.

3. The method which comprises preparing a reaction mass comprising a monomeric polymerizable material in an aqueous medium having a pH of from about 2.0 to about 3.6 and having a content of said polymerizable material not greater than 50%, said monomeric material being selected from the group consisting of (1) acrylonitrile and (2) mixtures containing more than 50% by weight of acrylonitrile, the balance being at least one other different compound which is copolymerizable with acrylonitrile and which contains a $CH_2=C<$ grouping; introducing into said reaction mass a redox-catalyst system comprising chlorate ions and sulfite ions, the amount of the chlorate ions being within the range of from about 0.1% to about 2% and that of the sulfite ions within the range of from about 0.1% to about 6%, said percentages being by weight of the said monomeric polymerizable material; polymerizing the reaction mass containing the said redox-catalyst system and monomeric polymerizable material; and, at any norm of chlorate ions and of sulfite ions within the aforementioned ranges of percentage proportions of said ions to said monomeric material and while keeping the said reaction mass at a substantially constant temperature and at a substantially constant pH between about 2.0 and about 3.6, improving the useful properties of the resulting polymer, especially for fiber purposes, by decreasing below said norm the ratio of molar equivalents of sulfite ions to said monomeric material together with a decrease in the ratio of molar equivalents of chlorate ions to said monomeric material that is greater than the decrease below said norm in the ratio of molar equivalents of sulfite ions to said monomeric material, the amounts of the chlorate and sulfite ions after said decreases remaining, however, within the aforesaid ranges of from about 0.1% to about 2% of chlorate ions and about 0.1% to about 6% of sulfite ions based on the weight of said monomeric polymerizable material.

4. A method as in claim 3 wherein the chlorate and sulfite ions are derived from sodium chlorate and sodium sulfite, respectively.

5. A method as in claim 4 wherein the monomeric material comprises at least 70% by weight of acrylonitrile.

6. The method which comprises preparing a reaction mass comprising monomeric material in an aqueous medium having a pH of from about 2.0 to about 3.6 and having a content of said material not greater than 50%, said monomeric material comprising at least 80% by weight of acrylonitrile, from 2 to 15% by weight of vinyl acetate, and from 2 to 15% by weight of a vinylpyridine; introducing into said reaction mass a redox-catalyst system comprising chlorate ions and sulfite ions derived from sodium chlorate and sodium sulfite, respectively, the amount of the chlorate ions being within the range of from about 0.1% to about 2% and that of the sulfite ions within the range of from about 0.1% to about 6%, said percentages being by weight of the said monomeric material; polymerizing the reaction mass containing the said redox-catalyst system and monomeric material; and, at any norm of chlorate ions and of sulfite ions within the aforementioned ranges of percentage proportions of said ions to said monomeric material and while keeping the said reaction mass at a substantially constant temperature and at a substantially constant pH between about 2.0 and about 3.6, improving the useful properties of the resulting polymer, especially for fiber purposes, by decreasing below said norm the ratio of molar equivalents of sulfite ions to said monomeric material together with a decrease in the ratio of molar equivalents of chlorate ions to said monomeric material that is greater than the decrease below said norm in the ratio of molar equivalents of sulfite ions to said monomeric material, the amounts of the chlorate and sulfite ions after said decreases remaining, however, within the aforesaid ranges of from about 0.1% to about 2% of chlorate ions and about 0.1% to about 6% of sulfite ions based on the weight of said monomeric material.

7. The method which comprises polymerizing, in an aqueous medium having a pH not higher than about 4.0 and using a redox-catalyst system comprising chlorate ions and sulfite ions, a polymerizable material selected from the group consisting of (1) acrylonitrile and (2) mixtures containing more than 50% by weight of acrylonitrile, the balance being at least one other different compound which is copolymerizable with acrylonitrile and which contains a $CH_2=C<$ grouping, the content of said polymerizable material in the aqueous medium being not greater than 50% and the amount of the aforesaid chlorate ions being within the range of from about 0.1% to about 3% and that of the aforesaid sulfite ions within the range of from about 0.1% to about 9%, said percentages being by weight of the said polymerizable material; and, at any norm of chlorate ions and of sulfite ions within the aforementioned ranges of percentage proportions of said ions to said polymerizable material and while keeping the said reaction mass at a substantially constant temperature and at a substantially constant pH not higher than about 4.0, improving the useful properties of the resulting polymer, especially for fiber purposes, by decreasing below said norm the ratio of molar equivalents of sulfite ions to said polymerizable material together with a decrease in the ratio of molar equivalents of chlorate ions to said polymerizable material that is greater than the decrease below said norm in the ratio of molar equivalents of sulfite ions to said polymerizable material, the amounts of the chlorate and sulfite ions after said decreases remaining, however, within the aforesaid ranges of from about 0.1% to said polymerizable material, the amounts of the 9% of sulfite ions based on the weight of said polymerizable material.

References Cited in the file of this patent

UNITED STATES PATENTS

| | | |
|---|---|---|
| 2,628,223 | Richards | Feb. 10, 1953 |
| 2,673,192 | Hill | Mar. 23, 1954 |
| 2,751,374 | Cresswell | June 19, 1956 |
| 2,769,793 | Ham | Nov. 6, 1956 |
| 2,777,832 | Mallison | Jan. 15, 1957 |